United States Patent Office 2,906,560
Patented Sept. 29, 1959

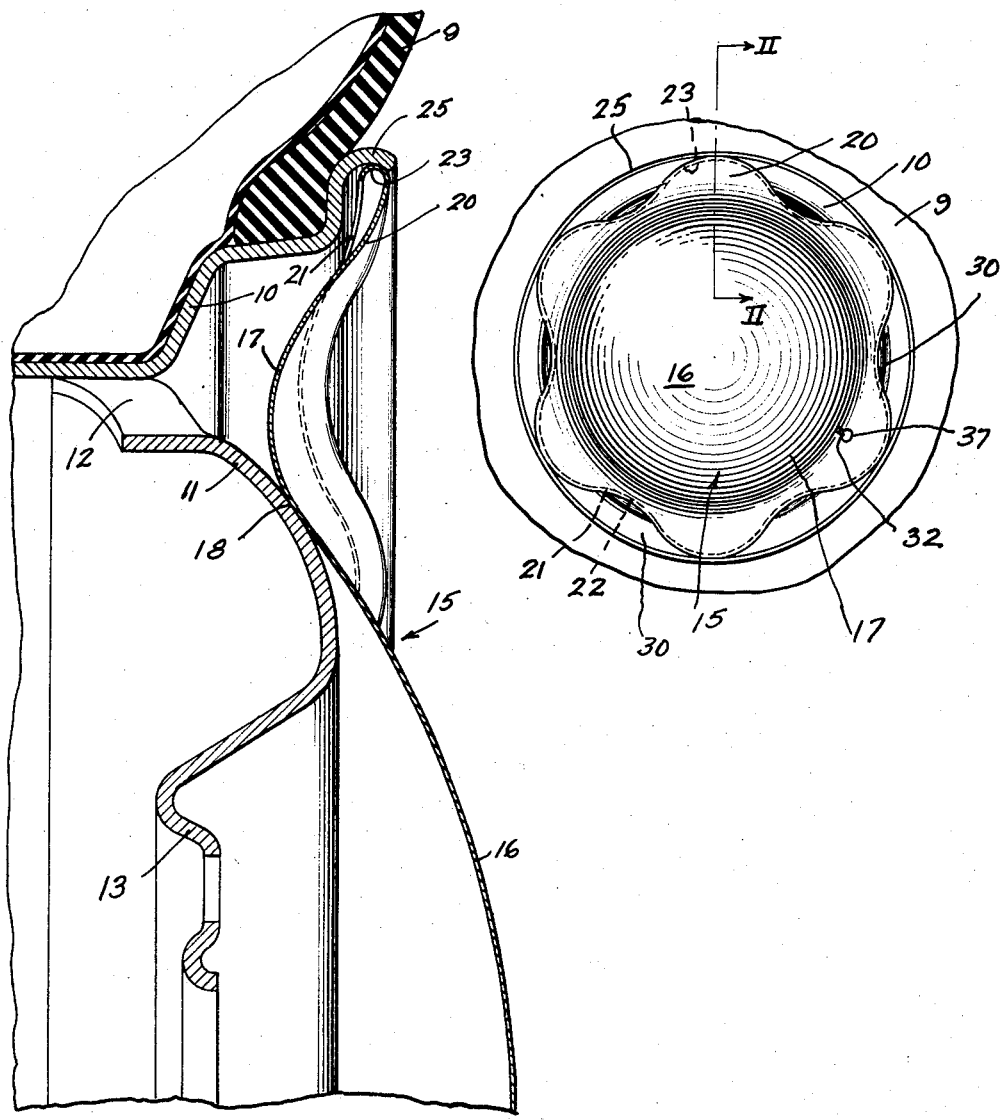

2,906,560

WHEEL COVER

George Albert Lyon, Detroit, Mich.

Application September 23, 1955, Serial No. 536,069

13 Claims. (Cl. 301—37)

This invention relates to wheel covers and more particularly to an automobile wheel cover having spoke portions for retaining the cover on the wheel.

This present subject matter is a continuation-in-part of that of my co-pending application Serial No. 264,359 filed January 2, 1952 which is now abandoned.

An object of this invention is to provide a simple and inexpensive way of retaining a wheel cover on an automobile wheel.

Another object of this invention is to provide a wheel cover wherein marginal portions of the blank from which the cover is stamped are utilized to form spoke portions which are so disposed with reference to the cover proper that they can retainingly engage the tire rim of the wheel for holding the cover on the wheel.

Yet another object of this invention is to provide an improved wheel cover which will enable proper cooling of the wheel by the circulation of air therethrough and which at the same time is of a simple one-piece construction so that it can be economically manufactured on a large production scale.

In accordance with the general features of this invention, there is provided a wheel cover having its peripheral portion formed into a plurality of spaced spoke simulating portions, each of which has a turned lip for resilient cover retaining engagement at its outer turned edge with the rim of the wheel.

Another feature of the invention relates to forming the periphery of the cover so that the cover retaining spoke portions alternate with openings which permit the circulation of air through the peripheral margin of the cover as the wheel rotates.

Other objects and features of this invention will more fully appear from the following detailed description taken in connection with the accompanying drawings which illustrate a single embodiment thereof and in which—

Figure 1 is a fragmentary side elevation of a wheel structure having my novel cover applied thereto; and Figure 2 is an enlarged fragmentary cross-sectional view taken on substantially the line II—II of Figure 1 looking in the direction indicated by the arrows.

As shown on the drawings:

The reference character 9 designates generally a pneumatic tire and tube assembly mounted in the usual way upon a conventional multi-flange drop center tire rim 10 which is of a type now well known in the automotive industry. This tire rim 10 is carried upon a dished metallic body member 11 secured to the base of the rim 10 at spaced intervals leaving wheel openings 12 through which air can circulate in the rotation of the wheel. In addition, the body member 11 has a central bolt-on flange 13 by means of which the wheel may be detachably fastened as by means of cap screws or bolts (not shown) to a brake drum or the like on an axle of an automobile.

Now, it is the objective of this invention to provide an improved wheel cover especially adapted for use with a wheel of the foregoing conventional type.

I have designated my novel wheel cover generally by the reference character 15 and have shown it as being applied to and held in retained cooperation with the above described wheel. This wheel cover may be made from any suitable material although I propose that it shall be made from metallic sheets such as stainless steel sheets. The construction of the cover is such that it lends itself to economical manufacture on a large production scale as by stamping on a punch press.

The cover 15 includes a dished area defined by a central crown portion 16 and an outer generally radially extending portion 17, the two portions 16 and 17 comprising divergent portions of the dished area in my cover. As shown in Figure 2 the junction of these two portions is adapted to bottom on the wheel body part 11 at 18 when the cover is on the wheel.

More specifically, my invention is concerned with the retention of this cover on the wheel and to this end portion 17 is formed into a symmetrical multi-lateral cover-retaining flange configuration providing a plurality of generally radially outwardly directed extensions alternating with deep indentations affording integral spaced lobe-like generally spoke-simulating portions or retaining elements 20. As will be noted from Figure 2, the cover margin is undulated not only in an axially inwardly axially outwardly continuous symmetric pattern, but in addition, the outer edge of the margin is undulated in a smooth symmetric curve moving in a radially inwardly and radially outwardly direction to further define the cover margin and the retaining portions 17 to augment their resilient deflectability and to provide a highly attractive wheel cover. Since these elements are all identical, a description of one will suffice for all. The portions 17 are adapted to cooperate with the wheel to define air circulating channels between the portions 17 and between the cover and tire rim.

Each spoke portion terminates in a turned edge 23 adapted to seat in the radially inwardly facing groove of the grooved rim terminal flange 25 when the cover is retained on the wheel. Also, the edge 23 of each portion is continued at 21 into the turned edge 22 around the periphery of the cover so that the entire periphery of the cover has a turned edge 22 as shown by dotted lines in Figure 1.

The spoke-like portions 20 of the cover alternate with openings 30 formed in the outer periphery of the cover through which air can circulate, thereby permitting air to freely flow through the wheel openings 12 in the rotation of the wheel and cover.

Also, as shown in Figure 1, the cover proper is provided with a small opening 31 through which the usual valve stem 32 of the tire and tube assembly 9 can project in the usual way so as to be accessible from the exterior of the cover.

In the application of the cover to the wheel the hole 31 is first aligned with the valve stem 32 and then the cover is pressed axially into the wheel, thus causing the turned edges 23 of the spoke-like portions 20 to be cammed into the groove of the rim flange 25. Now, due to the resiliency of the portions 20 they can yield as they are snapped into the groove of the rim flange 25 and thereafter will have tensioned engagement with this flange for the purpose of retaining the cover on the wheel.

In the removal of the cover the same may be effected by inserting a suitable screwdriver in one of the openings 30 and engaging the same with the cover so that upon the application of a twisting force the cover can be easily ejected from its retained cooperation with the rim flange 25.

It should be noted that the spoke-like portions are disposed at such an angle between the cover and the rim flange 25 that they can effectively apply a cover retaining pressure to the rim flange 25 when they are snapped into engagement therewith.

I claim as my invention:

1. In a wheel structure, a wheel including a generally axial wheel surface, a wheel cover member for overlying retained disposition upon the wheel, said cover having an outer margin which is bulged at intervals not only radially outwardly but also axially outwardly to provide a series of spaced resiliently deflectable cover retaining portions at the periphery of the cover each biasable along said axial wheel surface into self retaining engagement with the wheel, said bulged retaining portions including a turned tip for resilient cover retaining engagement with the generally axial wheel surface.

2. In a wheel structure, a wheel including a generally axial wheel surface, a wheel cover member for overlying retained disposition upon the wheel, said cover having an outer margin which is bulged at intervals not only radially outwardly but also axially outwardly to provide a series of spaced resiliently deflectable cover retaining portions at the periphery of the cover each biasable along said axial wheel surface into self retaining engagement with the wheel, said bulged retaining portions including a turned tip for resilient cover retaining engagement with the generally axial wheel surface, said margin between said cover retaining portions being dished not only radially inwardly but also axially inwardly to augment the resilient deflectability of said retaining portions.

3. In a wheel structure, a wheel including a generally axial wheel surface, a wheel cover member for overlying retained disposition upon the wheel, said cover having an outer margin which is bulged at intervals not only radially outwardly but also axially outwardly to provide a series of spaced resiliently deflectable cover retaining portions at the periphery of the cover, each biasable along said axial wheel surface into self retaining engagement with the wheel, said bulged retaining portions including a turned tip for resilient cover retaining engagement with the generally axial wheel surface, said margin being continuously and symmetrically undulated not only in an axial direction but also having its turned tip undulated to further define said cover retaining portions.

4. In a wheel structure, a vehicle wheel including a curled terminal having a shoulder with a seat axially therebehind, a wheel cover member for overlying retained disposition upon the wheel with the cover being intermediately dished, said cover having an outer margin, said margin having an undulated generally axially extending radially facing edge providing a series of resiliently deflectable cover retaining portions each dished axially outwardly and biasable over the shoulder into retaining engagement in the seat.

5. As an article of manufacture, a wheel cover having its peripheral portion formed into a plurality of spaced lobe-like resiliently deflectable cover retaining portions, each of which has a turned under tip for resilient cover retaining engagement at circumferentially spaced intervals with the rim of the wheel, said cover having an annular axially inwardly dished area disposed radially inwardly of the lobe-like portion with the peripheral portion extending generally radially and axially outwardly linking the bottom of the dished area with the lobe-like portions.

6. As an article of manufacture a wheel cover having its peripheral portion formed into a plurality of spaced spoke simulating lobe-like portions, each of which has a turned tip for resilient cover retaining engagement with the rim of the wheel.

7. As an article of manufacture a wheel cover comprising a generally circular member having divergent portions including a central crown portion and a radial outer portion, said outer portion having a plurality of circumferential spaced angular lobar spoke-like portions, each including a turned edge for resilient cover retaining engagement with the wheel.

8. As an article of manufacture a wheel cover comprising a generally circular member having divergent portions including a central crown portion and a radial outer portion, said outer portion having a plurality of circumferential spaced lobar spoke-like portions, said spoke-like portions alternating with openings around the peripheral edge of the member adapted to permit air to circulate therethrough.

9. In a cover structure for a wheel including a multi-flanged tire rim having a turned outer flange defining a radially inwardly facing annular groove therein, a wheel cover comprising a circular member for disposition radially inward of said turned rim flange and having its peripheral portion formed into a plurality of lobe-like spoke simulating portions disposed at an angle to the cover member proper and bridging a gap between the outer periphery of the member and said turned rim flange, each of said lobe-like spoke portions having a turned edge for resilient nested engagement in said groove in the rim flange and for resiliently retaining the cover member on the wheel.

10. In a cover structure for a wheel including a multi-flanged tire rim having a turned outer flange defining a radially inwardly facing annular groove therein, a wheel cover comprising a circular member for disposition radially inward of said turned rim flange and having its peripheral portion formed into a plurality of lobe-like spoke simulating portions disposed at an angle to the cover member proper and bridging a gap between the outer periphery of the member and said turned rim flange, each of said lobe-like spoke portions having a turned edge for resilient nested engagement in said groove in the rim flange to resiliently retain the cover member on the wheel, said member having air openings alternating with said lobe-like portions and defined by a turned edge comprising a continuation of the turned edges of said lobe-like portions.

11. In a cover for disposition at the outer side of a vehicle wheel, a cover body having a margin comprising a symmetrical generally radially extending cover-retaining flange affording generally radially directed extensions from the cover body alternating with deep indentations providing lobe-like retaining portions with tips engageable with an annular generally radially oppositely facing portion of a wheel with the flange and extensions affording a substantial chamber therebehind for which the indentations provide peripheral air circulation openings.

12. In a cover for disposition at the outer side of a vehicle wheel, a cover body having a margin comprising a symmetrical multi-lateral cover-retaining flange affording generally radially directed extensions from the cover body alternating with deep indentations providing lobe-like retaining portions with tips engageable with an annular generally radially oppositely facing portion of a wheel, said flange having the multi-lateral edge continuously underturned about the entire periphery of the cover including the tips of the lobe-like extensions and the indentations.

13. In a wheel structure including a tire rim and a wheel body with a terminal flange on the tire rim providing a generally radially inwardly opening groove, a cover for the outer side of the wheel comprising a cover body having a margin comprising a symmetrical generally radially outwardly extending cover-retaining flange to lie opposite the tire rim and affording generally radially outwardly directed extensions therefrom alternating with deep indentations providing lobe-like retaining portions with turned tips engageable under resilient tension within the groove of the terminal flange for retaining the cover on the wheel, said indentations providing air circulation openings about the periphery of the cover extending substantially beyond the tire rim terminal flange for air movement through the openings.

References Cited in the file of this patent

UNITED STATES PATENTS

| D. 164,010 | Lyon | July 24, 1951 |
| 2,308,618 | Lyon | Jan. 18, 1943 |
| 2,421,386 | Lyon | June 3, 1947 |